United States Patent Office 3,520,887
Patented July 21, 1970

3,520,887
CERTAIN PYRIMIDINYLBENZENESULFONAMIDES
Ruth Heerdt, Mannheim-Feudenheim, Manfred Hubner, Ludwigshafen (Rhine), Felix Helmut Schmidt, Mannheim-Neuostheim, Kurt Stach, Mannheim-Waldhof, and Helmut Weber, Frankfurt am Main, Schwanheim, Germany, assignors to Boehringer Mannheim, GmbH, Antsgeicht, Mannheim, Germany
No Drawing. Filed Nov. 15, 1967, Ser. No. 683,130
Claims priority, application Germany, Nov. 29, 1966, B 90,051
Int. Cl. C07d *51/46*
U.S. Cl. 260—256.5          15 Claims

ABSTRACT OF THE DISCLOSURE

A novel class of sulfonamides is disclosed, the same constituting antidiabetic agents having marked blood sugar reducing activity. The compounds have the following formula:

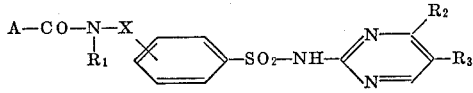

wherein A is unsubstituted or substituted alkyl, alkenyl, aryl, aralkyl, aryloxyalkyl, arylmercaptoalkyl, cycloalkyl, cycloalkenyl, thienyl, furyl, alkoxy, alkenyloxy, aralkoxy, cycloalkoxy or a group having the formula:

wherein V and W are each hydrogen, unsubstituted or substituted alkyl, cycloalkyl, aryl or aralkyl and taken together with the nitrogen atom to which they are attached form an unsubstituted or substituted saturated heterocyclic ring, $R_1$ is hydrogen, lower alkyl or aralkyl, X is a straight or branched chain hydrocarbon radical containing up to 4 carbon atoms, $R_2$ is lower alkyl and $R_3$ is hydrogen, unsubstituted or substituted alkyl, cycloalkyl, aryl, aralkyl, alkoxy, alkoxyalkyl and alkoxyalkoxy, wherein $R_2$ and $R_3$ taken together form a ring of 3 to 5 methylene groups which can contain oxygen or sulfur atoms.

Novel compositions containing the aforesaid sulfonamides as active ingredient as well as a method of using such compositions are also disclosed.

---

This invention relates to novel therapeutic sulfonamides, to compositions containing the same as active ingredients and to a method of using the same.

More particularly this invention relates to compositions of matter classified in the art of chemistry as benzenesulfonylamido pyrimidines which are characterized by a marked and particularly prolonged antidiabetic activity.

In accordance with the invention it has now been found that benzenesulfonamido pyrimidines which contain a carbamido alkyl substituent in the benzene nucleus are characterized by marked and prolonged antidiabetic activity. The sulfonamides in accordance with the invention are represented by the following formula:

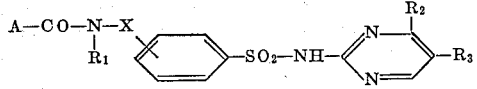

(I)

wherein A is unsubstituted or substituted alkyl, alkenyl, aryl, aralkyl, aryloxyalkyl, arylmercaptoalkyl, cycloalkyl, cycloalkenyl, thienyl, furyl, alkoxy, alkenyloxy, aralkoxy, cycloalkoxy, cycloalkylalkoxy, cycloalkenyloxy, cycloalkenylalkoxy or a group having the formula:

wherein V and W, which may be the same or different, are each hydrogen or unsubstituted or substituted alkyl, cycloalkyl, aryl or aralkyl and when taken together with the nitrogen atom to which they are attached form an unsubstituted or substituted saturated heterocyclic ring, $R_1$ is hydrogen, lower alkyl or aralkyl, X is a straight or branched-chain hydrocarbon radical containing up to 4 carbon atoms, $R_2$ is lower alkyl and $R_3$ is hydrogen or unsubstituted or substituted alkyl, cycloalkyl, aryl, aralkyl, alkoxy, alkoxyalkyl or alkoxyalkoxy, wherein $R_2$ and $R_3$ taken together can also form a ring of 3 to 5 methylene groups which ring can be interrupted by oxygen or sulfur atoms. The invention also includes the pharmaceutically acceptable alkali salts of the compounds I.

The manner and process of making and using the invention will now be generally described so as to enable a person skilled in the art of chemistry to make and use the same as follows.

The novel sulfonamides of the present invention can be prepared according to the known methods, as for example, by the following methods:

(a) A compound of the formula:

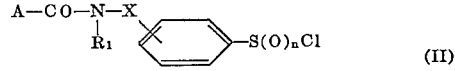

(II)

wherein A, $R_1$ and X have the same meanings as given above and n is 0, 1 or 2, is reacted with a 2-amino-pyrimidine of the formula:

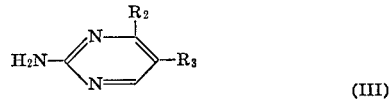

(III)

wherein $R_2$ and $R_3$ have the same meanings as given above, whereafter, if necessary, the product obtained is oxidized to provide the desired sulfonamide; or (b) A benzene-sulfonyl-guanidine of the formula:

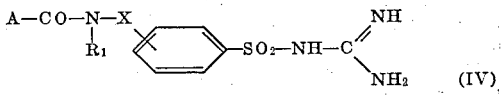

(IV)

wherein A, $R_1$ and X have the same meanings as given above, is reacted with a compound of the formula:

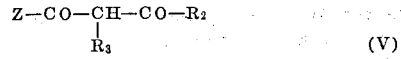

(V)

wherein $R_2$ and $R_3$ have the same meanings as given above and Z is hydrogen or alkoxy, or with a functional derivative thereof. Thereafter, in the case of the preparation of pyrimidines which are hydroxylated in the 6-position, the reaction product is converted into the desired pyrimidine which is unsubstituted in the 6-position by halogenation, followed by reductive dehalogenation; or (c) A compound of the formula:

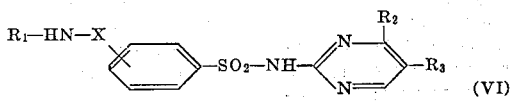

(VI)

wherein X, $R_1$, $R_2$ and $R_3$ have the same meanings as given above, is reacted with a reactive derivative of an acid of the formula A.COOH, wherein A has the same meaning as given above; or (d) A sulfonamide of the formula:

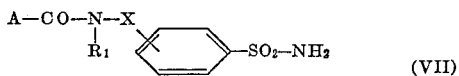

wherein A, $R_1$ and X have the same meanings as given above, is reacted with a pyrimidine derivative of the formula:

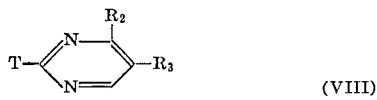

wherein $R_2$ and $R_3$ have the same meanings as given above and T is a reactive ester group or a lower molecular trialkylammonium group. Thereafter, if desired, the product which is obtained is converted, in the conventional manner, into its corresponding physiologically compatible salt.

The reaction of compounds (II) and (III) is advantageously carried out in an inert solvent in the presence of a base, preferably pyridine or trimethylamine. However, it is also possible to use twice the amount of the aminopyirimidine (III) in order to remove the hydrogen chloride formed by the reaction. The oxidation of the sulfenamides or sulfinamides which follows is carried out in the conventional manner as for example, by the action of hydrogen peroxide, potassium permanganate or nitric acid.

The benzene-sulfonyl-guanidines (IV) used as starting materials can be prepared, for example, by melting together the corresponding benzene-sulfonamides with guanidine carbonate. The condensation with the β-dicarbonyl compounds (V) can be carried out, for example, by means of an alkali metal alcoholate in an alcohol. The β-dicarbonyl compounds (V) can in this connection be used either in the free form or in the form of a functional derivative thereof, such as for example their corresponding acetals. They can, however, also be prepared in a "one pot process" using the Vilsmeier method starting from the ketals of the corresponding enamines, inorganic acid chlorides and dialkyl-formamides. If, in place of the dicarbonyl compounds, there are used the correspondingly substituted β-keto esters or their functional derivatives, then the hydroxyl group present in the 6-position of the pyrimidine ring must thereafter be replaced by a hydrogen atom. This can be carried out for example, by replacing the hydroxyl group with a chlorine atom by means of an inorganic acid chloride, which can thereafter be easily removed through reduction with, for example, zinc dust.

The acylation of the compounds (VI) is carried out in the conventional manner, as for example, by reaction with the corresponding acid halides, preferably in the presence of an acid acceptor, or with reactive derivatives thereof. When A represents a substituted hydroxyl group, it is advantageous to employ as starting materials chlorocarbonic acid esters or the corresponding orthocarbonic acid esters. The radical:

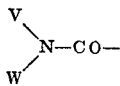

can be introduced by reaction with carbamic acid halides or the corresponding isocyanates. However, the compounds (VI) can also first be reacted with phosgene and the intermediate products thus obtained thereafter reacted with an appropriate alcohol or with an amine of the formula:

As starting materials having structural Formula VIII, it is especially preferred to use the 2-halopyrimidines. These can be obtained, for example, by the reaction of 2-hydroxy-pyrimidines with excess phosphorus oxychloride. The condensation reaction, according to the present invention, with the benzene-sulfonamides (VII) preferably takes place in the presence of a base, such as potassium carbonate. In place of the 2-halopyrimidines, there can also be used the corresponding trialkylammonium pyrimidines, with which the sulfonamides react to give the desired benzene-sulfonamido-pyrimidines, a trialkylamine also being formed as a by-product.

The pharmaceutically acceptable alkali salts of the sulfonamides embraced by the above Formula I are also included within the scope of this invention since such salts are effective for use in our novel therapeutic process because of their content of active sulfonamide.

The preferred pharmaceutically effective salts of the new sulfonamides of the present invention are those with ammonia, the alkali metals and the alkaline earth metals. They can be obtained, for example, by reaction of the free sulfonamide with sodium hydroxide solution, potassium hydroxide solution or an aqueous solution of ammonia or by reaction of the free sulfonamide with the corresponding carbonates.

This invention is further illustrated by the following examples which disclose the preparation of compounds illustrative of this invention.

EXAMPLE 1

4-(β-5′-chloro-2′-methoxy-benzamino-ethyl)-N-[4-methyl-5-isobutyl-pyrimidinyl-(2)]-benzene-sulfonamide 3.4 g. 4-(β-5′-chloro-2′-methoxy-benzamino - ethyl)-benzene-sulfochloride (M.P. 106–109° C.) were added to 1.7 g. 2-amino-4-methyl-5-isobutyl-pyrimidine (M.P. 158° C.) in 6 ml. anhydrous pyridine. The reaction mixture was first allowed to stand for 1.5 hours at ambient temperature, then heated for 2 hours on a steam bath and, after cooling, poured into water. The product which thereupon precipitated out was filtered off and dissolved in a dilute solution of sodium hydroxide. The solution was treated with activated charcoal and filtered and the sulfonamide product precipitated out of the filtrate with dilute hydrochloric acid. After filtering off the precipitate with suction, the recovered product was purified by recrystallizing it twice from ethanol. There were recovered 1.7 g. (33% of theory) 4-(β-5′-chloro-2′-methoxy-benzamino-ethyl)-N-[4-methyl-5-isobutyl-pyrimidinyl - (2)]-benzene-sulfonamide having a melting point of 174–175° C.

The following compounds were prepared in an analogous manner:

4 - (β - 5′ - chloro - 2′ - methoxy - benzamino - ethyl)-N - [4 - butyl - pyrimidinyl - (2)] - benzene-sulfonamide; M.P. 139–140° C. (recrystallized from ethyl acetate), as starting material there was used 2-amino-4-butyl-pyrimidine; M.P. 105–107° C.; 4-(β-5′-chloro-2′-methoxy-benzamino - ethyl) - N - [4 - isobutyl - pyrimidinyl - (2)]-benzene-sulfonamide; M.P. 166° C. (recrystallized from ethanol), as starting material, there was used 2-amino-4-isobutyl-pyrimidine; M.P. 119–120° C.;

4 - (β - 5′ - chloro - 2′ - methoxy - benzamino - ethyl)-N-[4 - methyl - 5 - propyl - pyrimidinyl - (2)] - benzene-sulfonamide; M.P. 188–189° C.; for purification, the latter compound was successively recrystallized from methyl ethyl ketone, methanol and ethylene chloride, as starting material, there was used 2-amino-4-methyl-5-propyl-pyrimidine; M.P. 163° C.;

4 - (β - 5′ - chloro - 2′ - methoxy - benzamino - ethyl)-N - [4 - methyl - 5 - isopropyl - pyrimidinyl - (2)]-benzene-sulfonamide; M.P. 178–180° C.; the compound was purified by recrystallizing the sodium salt from water and then the free compound from ethanol, as starting material there was used 2-amino-4-methyl-5-isopropyl-pyrimidine; M.P. 145–146° C.;

4 - (β - 5′ - chloro - 2′ - methoxy - benzamino - ethyl)-N - [5,6,7,8 - tetrahydroquinazolinyl - (2)] - benzene-sulfonamide; M.P. 204–207° C. (recrystallized from chloroform/methanol), as starting material there was used 2 - amino - 5,6,7,8 - tetrahydroquinazoline; M.P. 208–210° C.;

4 - (β - benzamino - ethyl) - N - [5,6,7,8 - tetrahydroquinazolinyl - (2)] - benzene - sulfonamide; M.P. 218–220° C. (recrystallized from ethylene glycol);

4 - (β - 5' - chloro - 2' - ethoxy - benzamino - ethyl) - N - [4 - methyl - 5 - isopropyl - pyrimidinyl - (2)] - benzene-sulfonamide; M.P. 173° C. (recrystallized from methanol), as starting material there was used 4-(β-5'-chloro-2' - ethoxy - benzamino - ethyl) - benzene - sulfochloride; M.P. 123–125° C.; and 4 - (β - 5' - chloro - 2' - ethoxy - benzamino - ethyl) - N - [4 - methyl - 5 - isobutyl - pyrimidinyl - (2)]-benzene-sulfonamide; M.P. 183° C. (recrystallized from ethanol).

EXAMPLE 2

4-(β-ethoxycarbonylamino-ethyl)-N-[5,6,7,8-tetrahydroquinazolinyl-(2)]-benzene-sulfonamide 11 g. 2 - amino - 5,6,7,8 - tetrahydroquinazoline were introduced, with cooling, into 21.5 g. 4-(β-ethoxycarbonylamino - ethyl) - benzene - sulfochloride (M.P. 68–71° C.) in 30 ml. anhydrous pyridine. The reaction mixture was allowed to stand overnight at room temperature and then heated on a steam bath for one hour. After cooling, the reaction mixture was poured into water. The crystals which thereby precipitated out were filtered off with suction and dissolved in dilute sodium hydroxide solution. The solution of the sodium salt thus obtained was treated with activated charcoal and the free compound then precipitated out by the addition of hydrochloric acid. Following recrystallization from ethanol, there were obtained 16 g. (53.5% of theory) 4-(β-ethoxy-carbonylamino-ethyl) - N - [5,6,7,8 - tetrahydroquinazolinyl - (2)]-benzene-sulfonamide, having a melting ponit of 168–169° C.

In an analogous manner there were obtained 4-(β-ethoxycarbonylamino - ethyl) - N - [4 - methyl - 5 - isobutyl - pyrimidinyl - (2)] - benzene - sulfonamide; M.P. 166° C. (recrystallized from ethanol).

EXAMPLE 3

4-(β-acetaminoethyl)-N-[5,6,7,8-tetrahydroquinazolinyl-(2)]-benzene-sulfonamide

A solution of 11 g. phosgene in 11 ml. methylene chloride was added, with stirring and ice cooling, to a solution of 7.3 g. dimethyl formamide in 15 ml. methylene chloride. The resultant crystalline slurry was allowed to stand at ambient temperature for 3 hours. At about −5° C. a solution of 15.1 g. 1-pyrrolidino-cyclohexene in 11 ml. methylene chloride was added thereto. Following the distilling off of a part of the solvent, 50 ml. methanol were added and the remainder of the methylene chloride distilled off. The mixture which was thereby obtained, was neutralized with a solution of sodium methylate, mixed with 22.7 g. 4-(β-acetaminoethyl)-benzene-sulfonyl-guanidine (M.P. 120° C.) and with a further 36 g. of 30% sodium methylate solution and then heated under reflux for 10 hours. After cooling, the mixture was filtered with suction, the residue taken up in water, the resultant solution filtered through charcoal and hydrochloric acid added to the filtrate to precipitate out 4-(β-acetaminoethyl)-N-[5,6,7,8-tetrahydroquinazolinyl - (2)] - benzene - sulfonamide. The initially oily product which precipitated out was triturated with ethanol and was thereby caused to crystallize. Further amounts of the product could be recovered from the evaporated methanolic filtrate. After recrystallization from ethanol, the yield of 4-(β-acetaminoethyl)-N-[5,6,7,8-tetrahydroquinazolinyl - (2)] - benzene-sulfonamide amounted to 6 g. (20% of theory) and had a melting point of 184° C. The analytical results corresponded to a monohydrate.

EXAMPLE 4

4 - (β - 4' - chloro - 2' - methoxy - benzamino - ethyl) - N-[4 - methyl - 5 - isobutyl - pyrimidinyl - (2)] - benzene-sulfonamide 3.48 g. 4-(β-aminoethyl)-N-[4-methyl-5-isobutyl-pyrimidinyl-(2)]-benzene-sulfonamide were dissolved in 5 ml. 2 N sodium hydroxide solution, diluted with some water and a solution of 2.1 g. 4-chloro-2-methoxy-benzoyl-chloride in 5 ml. methylene chloride slowly added thereto in dropwise fashion. The reaction mixture was then stirred for one hour at ambient temperature and the material precipitated out thereby filtered off with suction, washed with a little methylene chloride, dissolved in a dilute solution of sodium hydroxide and again precipitated by the addition of dilute hydrochloric acid. There were thusly obtained 3.9 g. (75% of theory) 4-(β-4'-chloro-2'-methoxy-benzamino - ethyl) - N - [4 - methyl - 5 - isobutyl-pyrimidinyl-(2)]-benzene-sulfonamide having a melting point of 180–183° C.

The 4-(β-aminoethyl)-N-[4-methyl-5-isobutyl - pyrimidinyl - (2)] - benzene - sulfonamide (M.P. 197–199° C.) which was used as starting material was prepared by the alkaline hydrolysis of the urethane prepared according to the procedure described in Example 2.

The following compounds were obtained in an analogous manner:

4 - (β - 5' - bromo - 2' - methoxy - benzamino - ethyl) - N - [4 - methyl - 5 - isobutyl-pyrimidinyl - (2)] - benzene-sulfonamide; M.P. 179–180° C.; and 4 - (β - 3' - methoxy - thenoyl - (2') - amino - ethyl) - N - [4 - methyl - 5 - isobutyl-pyrimidinyl - (2)] - benzene-sulfonamide; M.P. 157° C. (recrystallized from ethanol).

EXAMPLE 5

In a manner analogous to that described in Example 4, there were obtained from 4-(β-aminoethyl)-N-[5,6,7,8-tetrahydroquinazolinyl-(2)]-benzene-sulfonamide the following compounds:

4 - (β - 3' - chlorobenzamino - ethyl)-N-[5,6,7,8-tetrahydroquinazolinyl-(2)]-benzene-sulfonamide; M.P. 180–181° C. (recrystallized from ethanol);

4 - (β - 2' - methoxy - 5' - methyl - benzamino - ethyl)-N - [5,6,7,8 - tetrahydroquinazolinyl - (2)] - benzene-sulfonamide; M.P. 194–195° C. (recrystallized from ethanol); and 4 - (β - phenylmercapto-acetamino-ethyl) - N - [5,6,7,8-tetrahydroquinazolinyl - (2)] - benzene - sulfonamide; for purification, after reprecipitation, the latter product was successively recrystallized from ethylene chloride and dioxan; M.P. 191–193° C.

The 4-(β-aminoethyl)-N-[5,6,7,8-tetrahydroquinazolinyl-(2)]-benzene-sulfonamide (M.P. 210–212° C.) used as starting material was obtained by the alkaline hydrolysis of the urethane which had been prepared according to Example 2 or of the acetyl compound prepared according to Example 3.

EXAMPLE 6

4-(β-cyclohexane-carbonamino-ethyl)-N-[5,6,7,8-tetrahydroquinazolinyl-(2)]-benzene-sulfonamide 1.3 g. cyclohexane-carboxylic acid chloride were added to 3 g. 4-(β-aminoethyl)-N-[5,6,7,8-tetrahydroquinazolinyl-(2)]-benzene-sulfonamide in 5 ml. anhydrous pyridine. The reaction mixture was allowed to stand for 4 hours at ambient temperature then heated for 1 hour on a steam bath, and, after cooling, poured into water. The resultant precipitated material was dissolved in dilute sodium hydroxide solution, the solution filtered over activated charcoal and dilute hydrochloric acid added to the filtrate to precipitate out 4-(β-cyclohexane-carbonaminoethyl)-N-[5,6,7,8 - tetrahydroquinazolinyl - (2)] - benzene-sulfonamide. Following recrystallization from ethanol, the yield of sulfonamide was 1.4 g. (32% of theory) and the compound had a melting point of 240° C.

In an analogous manner there was prepared 4-(β-2'-methoxy - benzamino - ethyl) - N - [5,6,7,8 - tetrahydroquinazolinyl-(2)]-benzene-sulfonamide; M.P. 201–202° C. (recrystallized from ethanol/ethylene chloride).

EXAMPLE 7

4-(β-3-methyl-3-phenylureido-ethyl)-N-[4-methyl-5-isobutyl-pyrimidinyl-(2)]-benzene-sulfonamide A solution of 3.48 g. 4 - (β-aminoethyl)-N-[4-methyl-5-isobutyl-pyrimidinyl-(2)]benzene-sulfonamide in 5 ml. 2 N sodium hydroxide solution was diluted with a little water and a solution of 1.7 g. methyl-phenyl-carbamoyl chloride in 5 ml. of methylene chloride slowly added thereto in dropwise fashion. The resultant reaction mixture was thereafter stirred for one hour at ambient temperature. The precipitated material which formed was filtered off with suction, washed with methylene chloride, dissolved in a dilute solution of sodium hydroxide and the product again precipitated out by the addition of dilute hydrochloric acid. There were recovered 3.7 g. (77% of theory) 4 - (β - 3 - methyl-3-phenylureido-ethyl)-N-[4 - methyl - 5-isobutyl-pyrimidinyl-(2)]-benzene-sulfonamide having a melting point of 154–156° C.

In an analogous manner there was obtained 4-(β-indoline - 1 - carbonamino-ethyl) - N - [5,6,7,8-tetrahydroquinazolinyl-(2)]-benzene-sulfonamide; for purification, the product was first recrystallized from ethanol/ethylene chloride, then dissolved in a dilute solution of sodium hydroxide and precipitated out by introduction of carbon dioxide; M.P. 236–238° C.

EXAMPLE 8

4-(β-benzaminoethyl)-N-(6,7,8,9-tetrahydro-5H-cyclohepta-[d]-pyrimidin-2-yl)-benzene-sulfonamide 4.15 g. 4-(β - benzaminoethyl)-benzene-sulfonyl-guanidine (M.P. 278–279° C.) and 2.0 g. 2-formyl-cycloheptanone were boiled under reflux for 8 hours in 20 ml. of glacial acetic acid. The glacial acetic acid was evaporated off in a vacuum the residue stirred with water, filtered with suction, dissolved in dilute sodium hydroxide solution and filtered off from the unreacted sulfonyl-guanidine. After treatment with activated charcoal and filtering, carbon dioxide was introduced into the filtrate until the saturation point had been reached, the precipitate thereby formed filtered off with suction, boiled out with ethanol and again reprecipitated using the same procedure as before. There was obtained 2.2 g. 4-(β-benzaminoethyl)-N-(6,7,8,9-tetrahydro - 5H-cyclohepta - [d]-pyrimidin-2-yl)-benzene-sulfonamide (40.6% of theory), having a melting point of 206–207° C.

EXAMPLE 9

4-(β-4'-fluorobenzamino-ethyl)-N-[4-methyl-5-propyl-pyrimidinyl-(2)]-benzene-sulfonamide In a manner analogous to that described in Example 1, there was obtained from 4 - (β-4'-fluorobenzamino-ethyl)-benzene-sulfochloride (M.P. 131–134° C.) and 2-amino-4-methyl-5-propyl-pyrimidine, in 42% yield, 4-(β-4'-fluorobenzamino-ethyl) - N - [4-methyl - 5 - propyl-pyrimidinyl-(2)]-benzene-sulfonamide which following recrystallization from ethanol, had a melting point of 187–188° C.

EXAMPLE 10

4 - (N-methyl-β-5'-chloro-2'-methoxy-benzamino-ethyl)-N-(6,7,8,9-tetrahydro - 5H - cyclohepta-[d]-pyrimidin-2-yl)-benzene-sulfonamide 5.4 g. of 4-(N-methyl - β - 5' - chloro-2'-methoxybenzamino-ethyl)-benzene-sulfochloride were added to 2.2 g. 2-amino-6,7,8,9-tetrahydro - 5H - cyclohepta-[d]-pyrimidine (M.P. 146° C.) in 10 ml. anhydrous pyridine, the reaction mixture allowed to stand overnight, then heated for 1 hour on a steam bath and, after cooling, poured into 50 ml. water. The substance which was thereby precipitated out was filtered off, dissolved in dilute sodium hydroxide solution, the solution treated with activated charcoal and the product then precipitated out by acidification with dilute hydrochloric acid. The precipitate which formed by filtered off with suction and then recrystallized from a mixture of ethanol and chloroform. There was thusly obtained 3.8 g. (54% of theory) 4-(N-methyl - β - 5' - chloro-2'-methoxy-benzamino-ethyl)-N-(6,7,8,9 - tetrahydro - 5H - cyclohepta-[d]-pyrimidin-2-yl)-benzene-sulfonamide with a melting point of 195–196° C.

In an analogous manner there was obtained 4 - (β-5'-chloro - 2' - methoxy-benzamino-ethyl)-N-(6,7,8,9-tetrahydro-5H - cyclohepta - [d] - pyrimidin-2-yl)-benzene-sulfonamide; for purification, the sodium salt of this compound was recrystallized from water and the free compound precipitated out by introduction of carbon dioxide up to the saturation point; M.P. 187–189° C.

EXAMPLE 11

4-(β-phenoxyacetoamino-ethyl)-N-[4-methyl-5-isobutyl-pyrimidinyl-(2)]-benzene-sulfonamide 1.7 g. 4-(aminoethyl) - N - [4-methyl - 5 - isobutyl-pyrimidinyl(2)]-benzene-sulfonamide were dissolved in 2.5 ml. 2 N sodium hydroxide solution, diluted with some water and, while stirring and cooling, a solution of 0.85 g. phenoxyacetyl chloride in 3 ml. methylene chloride slowly added thereto in dropwise fashion. The reaction mixture was stirred for 2 hours at ambient temperature, the precipitated material then filtered off with suction, washed with water and ether, dissolved in dilute sodium hydroxide solution and again precipitated out by the addition of dilute hydrochloric acid. The product was thereafter recrystallized from methanol. There was obtained 2.0 g. (85% of theory) 4 - (β - phenoxyacetamino-ethyl)-N - [4-methyl - 5 - isobutyl-pyrimidinyl-(2)]-benzenesulfonamide having a melting point of 130° C.

In an analogous manner, there were obtained the following compounds:

4-(β-hydrocinnamoylamino-ethyl)-N-[4 - methyl-5 isobutyl-pyrimidinyl-(2)]-benzene-sulfonamide; M.P. 167° C. (recrystallized from methanol);

4 - (β-2',5' - dimethoxy-benzamino-ethyl)-N-[4-methyl-5-isobutyl-pyrimidinyl-(2)] - benzene - sulfonamide; M.P. 169° C. (after dissolving in dilute sodium hydroxide solution and precipitating out with dilute hydrochloric acid);

4-(β-o-toluoylamino-ethyl)-N-[4-methyl - 5 - isobutyl-pyrimidinyl - (2)] - benzene-sulfonamide; M.P. 170° C. (recrystallized from methanol); and 4-(β-m-toluoylamino-ethyl)-N-[4-methyl - 5 - isobutyl-pyrimidinyl-(2)]-benzene-sulfonamide; M.P. 180–182° C. (recrystallized from methanol).

EXAMPLE 12

4-(β-5'-chloro-2'-methoxy-benzamino-ethyl)-N-[4,5-diethyl-pyrimidinyl-(2)]-benzene-sulfonamide 3.9 g. 4 - (β - 5' - chloro-2'-methoxy-benzamino-ethyl)-benzene-sulfochloride were added, with stirring and cooling, to 1.5 g. 2-amino-4,5-diethyl-pyrimidine (M.P. 131° C.) in 6 ml. anhydrous pyridine. The reaction mixture was first allowed to stand for 2 hours at ambient temperature and then heated for 2 hours on a steam bath. Following cooling, the mixture was poured into 50 ml. water. The substance which was thereby precipitated out was filtered off, dissolved in dilute sodium hydroxide solution, the solution treated with activated charcoal, filtered and the free compound precipitated out from the filtrate by acidification with dilute hydrochloric acid. The precipitated product was thereafter recrystallized from a methanol. There was recovered 2.6 g. 4-(β-5'-chloro-2'-methoxy-benzamino-ethyl) - N - [4,5-diethyl-pyrimidinyl-(2)]-benzene-sulfonamide (52% of theory) having a melting point of 176–177° C.

The following compounds were obtained in an analogous manner:

4-(β-5'-chloro-2'-methoxy-benzamino-propyl) - N -[4-methyl-5-isobutyl - pyrimidinyl - (2)] - benzene-sulfonamide; for purification, the compound was first recrystallized from methanol, then dissolved in dilute sodium hydroxide solution and fractionally precipitated with dilute acetic acid; M.P. 172–175° C.; and 4-(β-5'-chloro-2'-methoxy-benzamino-ethyl) - N - (7,8-dihydro-5H-thiapyrano-[4,3-d]-pyrimidin - 2 - yl) - benzene-sulfonamide; M.P. 183–184° C. (recrystallized from methanol); as starting material there was used 2-amino-7,8-dihydro - 5H - thiapyrano - [4,3 - d]-pyrimidine; M.P. 221° C.

EXAMPLE 13

4-(5'-chloro-2'-methoxy-benzamino-methyl)-N-[4-methyl-5-isobutyl-pyrimidinyl-(2)]-benzene-sulfonamide Using a method analogous to that described in Example 12, 3.74 g. 4-(5'-chloro-2'-methoxy-benzamino-methyl)-benzene-sulfochloride (M.P. 113° C.) were reacted in 6 ml. anhydrous pyridine with 1.65 g. 2-amino-4-methyl-5-isobutyl-pyrimidine. The purification of the compound was also carried out by the procedure in Example 12, except that in the present case the product was recrystallized a second time from methanol. There were thereby obtained 1.5 g. (30% of theory) 4-(5'-chloro-2'-methoxy-benzamino-methyl)-N-[4-methyl - 5 - isobutyl-pyrimidinyl-(2)]-benzene-sulfonamide having a melting point of 147–148° C.

The blood sugar reducing activities of some of the new benzene-sulfonamido-pyrimidines were compared with that of the known compounds, i.e., 2-benzene-sulfonamido-5-methoxy - ethoxy - pyrimidine and $N_1$-sulfanilyl-$N_2$-(n-butyl)-urea. The blood sugar reducing activity was measured in the rabbit following administration of the test compounds. In each instance the threshold dose was determined, that is the smallest dose of test compound sufficient to effect a significant reduction in the blood sugar values. As set forth in the table, the data is reported as relative blood sugar reducing activities, i.e., referred to the blood sugar reducing activity of $N_1$-sulfanilyl-$N_2$-(n-butyl)-urea equal to 1. As determined by the above procedure the threshold dose of $N_1$-sulfanilyl-$N_2$-(n-butyl)-urea amounted to 200 mg./kg.

TABLE

| No. | Relative blood sugar reducing activity (rabbit i.v.) | Compound |
|---|---|---|
| 1 | 2,000 | 4-(β-5'-chlor-2'-methoxy-benzamino-ethyl)-N-[4-methyl-5-isobutyl-pryrimidinyl-(2)]-benzene-sulfonamide. |
| 2 | 80 | 4-(β-5'-chlor-2'-methoxy-benzamino-ethyl)-N-[4-butyl-pyrimidinyl-(2)]-benzene-sulfonamide. |
| 3 | 80 | 4-(β-5'-chlor-2'-methoxy-benzamino-ethyl)-N-[4-isobutyl-pyrimidinyl-(2)]-benzene-sulfonamide. |
| 4 | 800 | 4-(β-5'-chlor-2'-methoxy-benzamino-ethyl)-N-[4-methyl-5-propyl-pyrimidinyl-(2)]-benzene-sulfonamide. |
| 5 | 2,000 | 4-(β-5'-chlor-2'-methoxy-benzamino-ethyl)-N-[4-methyl-5-isopropyl-pyrimidinyl-(2)]-benzene-sulfonamide. |
| 6 | 800 | 4-(β-5'-chlor-2'-methoxy-benzamino-ethyl)-N-[5,6,7,8-tetrahydro-quinazolinyl-(2)]-benzene-sulfonamide. |
| 7 | 8,000 | 4-(β-5'-chlor-2'-ethoxy-benzamino-ethyl)-N-[4-methyl-5-isopropyl-pyrimidinyl-(2)]-benzene-sulfonamide. |
| 8 | 8,000 | 4-(β-5'-chlor-2'-ethoxy-benzamino-ethyl)-N-[4-methyl-5-isobutyl-pyrimidinyl-(2)]-benzene-sulfonamide. |
| 9 | 80 | 4-(β-ethoxycarbonylamino-ethyl)-N-[4-methyl-5-isobutyl-pyrimidinyl-(2)]-benzene-sulfonamide. |
| 10 | 400 | 4-(β-4'-chlor-2'-methoxy-benzamino-ethyl)-N-[4-methyl-5-isobutyl-pyrimidinyl-(2)]-benzene-sulfonamide. |
| 11 | 4,000 | 4-(β-5'-brom-2'-methoxy-benzamino-ethyl)-N-[4-methyl-5-isobutyl-pyrimidinyl-(2)]-benzene-sulfonamide. |
| 12 | 800 | 4-(β-3'-methoxy-thenoyl-(2')-amino-ethyl)-N-[4-methyl-5-isobutyl-pyrimidinyl-(2)]-benzene-sulfonamide. |
| 13 | 200 | 4-(β-3'-chlor-benzamino-ethyl)-N-[5,6,7,8-tetra-hydroquinazolinyl-(2)]-benzene-sulfonamide. |
| 14 | 800 | 4-(β-2'-methoxy-5'-methyl-benzamino-ethyl)-N-[5,6,7,8-tetrahydroquinazolinyl-(2)]-benzene-sulfonamide. |
| 15 | 80 | 4-(β-phenylmercapto-acetamino-ethyl)-N-[5,6,7,8-tetrahydroquinazolinyl-(2)]-benzene-sulfonamide. |
| 16 | 80 | 4-(β-cyclohexancarbonamino-ethyl)-N-[5,6,7,8-tetrahydroquinazolinyl-(2)]-benzene-sulfonamide. |
| 17 | 400 | 4-(β-2'-methoxy-benzamino-ethyl)-N-[5,6,7,8-tetrahydroquinazolinyl-(2)]-benzene-sulfonamide. |
| 18 | 80 | 4-(β-3-methyl-3-phenyl-ureido-ethyl)-N-[4-methyl-5-isobutyl-pyrimidinyl-(2)]-benzene-sulfonamide. |
| 19 | 80 | 4-(β-indolin-1-carbonamino-ethyl)-N-[5,6,7,8-tetra-hydroquinazolinyl-(2)]-benzene-sulfonamide. |
| 20 | 80 | 4-(β-benzaminoethyl)-N-(6,7,8,9-tetrahydro-5H-cyclohepta[d]pyrimidin-2-yl)-benzene-sulfonamide. |
| 21 | 80 | 4-(β-4'-fluorbenzamino-ethyl)-N-[4-methyl-5-propyl-pyrimidinyl-(2)]-benzene-sulfonamide. |
| 22 | 80 | 4-(N-methyl-β-5'-chlor-2'-methoxy-benzamino-ethyl)-N-(6,7,8,9-tetra-hydro-5H-cyclohepta[d]-pyrimidin-2-yl)-benzene-sulfonamide. |
| 23 | 800 | 4-(β-5'-chlor-2'-methoxy-benzamino-ethyl)-N-(6,7,8,9-tetrahydro-5H-cyclohepta[d]pyrimidin-2-yl)-benzene-sulfonamide. |
| 24 | 80 | 4-(β-phenoxyacetamino-ethyl)-N-[4-methyl-5-isobutyl-pyrimidinyl-(2)]-benzene-sulfonamide. |
| 25 | 80 | 4-(β-hydrocinnamoylamino-ethyl)-N-[4-methyl-5-isobutyl-pyrimidinyl-(2)]-benzene-sulfonamide. |
| 26 | 400 | 4-(β-2',5'-dimethoxy-benzamino-ethyl)-N-[4-methyl-5-isobutyl-pyrimidinyl-(2)]-benzene-sulfonamide. |
| 27 | 80 | 4-(β-o-toluoylamino-ethyl)-N-[4-methyl-5-isobutyl-pyrimidinyl-(2)]-benzene-sulfonamide. |
| 28 | 80 | 4-(β-m-toluoylamino-ethyl)-N-[4-methyl-5-isobutyl-pyrimidinyl-(2)]-benzene-sulfonamide. |
| 29 | 200 | 4-(β-5'-chlor-2'-methoxy-benzamino-ethyl)-N-[4,5-diethyl-pyrimidinyl-(2)]-benzene-sulfonamide. |
| 30 | 200 | 4-(β-5'-chlor-2'-methoxy-benzamino-propyl)-N-[4-methyl-5-isobutyl-pyrimidinyl-(2)]-benzene-sulfonamide. |
| 31 | 400 | 4-(β-5'-chlor-2'-methoxy-benzamino-ethyl)-N-(7,8-dihydro-5H-thiapyrano[4,3-d]pyrimidin-2-yl)-benzene-sulfonamide. |
| 32 | 400 | 4-(5'-chlor-2'-methoxy-benzamino-methyl)-N-[4-methyl-5-isobutyl-pyrimidinyl-(2)]-benzene-sulfonamide. |
| 33 | 10 | 2-benzenesulfonamido-5-methoxyethoxy-pyrimidine. (Comparison) |

The increase in activity of the compounds of the invention as compared to 2-benzenesulfonamido-5-methoxy-ethoxy-pyrimidine amount to at least 8-fold and up to 800-fold.

The threshold dose for the compounds in accordance with the invention determined in the rabbit and via the i.v. route amounted to 0.025–2.5 mg./kg. for oral administration, the effective threshold dose similarly amounted to about 0.025–2.5 mg./kg.

In normal clinical use, the compounds can be employed in both the free and the salt form, and it is to be understood that the claims thereof cover the salts as well as the fundamental compounds. The activity of the compounds is independent of whether they are in salt form or otherwise. Salts may be prepared by any of the well known standard methods. While the salt normally employed is the alkali salt and preferably the sodium salt, the compounds have been prepared in the form of other salts, such as potassium, ammonium, etc.

The products of this process may be combined with a pharmaceutical carrier for administration to humans in an amount to attain the desired blood sugar reducing effect. Such carriers are either solid or liquid. Exemplary of solid pharmaceutical carriers are lactose, cornstarch, mannitol, talc, etc. The compounds of this invention are mixed with a carrier and filled into hard gelatin capsules or tabletted with suitable tabletting aids, such as magnesium stearate, starch, or other lubricants, disintegrants or coloring agents. If combination with a liquid carrier is desirable, a soft gelatin capsule is filled with a slurry or other dispersion of the novel compounds in soya-bean, corn or peanut oil. Aqueous suspensions or solutions are prepared for alternate, oral or parenteral administration.

The dosage of the novel compounds of the present invention for the treatment of diabetes depends in the main on the age, weight and condition of the patient being treated. The preferable form of administration is via the oral route in connection with which dosage units containing 0.5–50 mg. of active compound in combination with a suitable pharmaceutical diluent is employed. One or two unit dosages are good from one to four times a day.

We claim:

1. A compound selected from the group consisting of sulfonamides of the formula

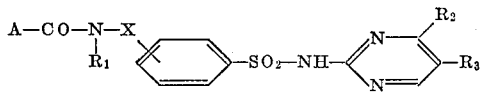

wherein X is an alkylene containing from 1 to 4 carbon atoms, A is a member selected from the group consisting of lower alkyl, lower alkoxy, phenyl, substituted phenyl containing up to 2 substitutents selected from the group consisting of halogen, lower alkyl and lower alkoxy; phenyloxy lower alkyl, phenyl mercapto lower alkyl cycloalkyl having not more than 6 carbon atoms, thienyl, phenyl lower alkyl and a group having the formula:

wherein V and W are each selected from the group consisting of lower alkyl and phenyl and when taken together with the nitrogen atom to which they are attached from an indoline ring; $R_1$ is a member selected from the group consisting of hydrogen and lower alkyl, and $R_2$ and $R_3$ are joined to form a ring of 3 to 5 methylene groups, wherein one methylene group can be replaced by a sulfur atom and the pharmaceutically acceptable alkali salts thereof.

2. A compound according to claim 1 designated 4-($\beta$-5' - chlor-2'-methoxy-benzamino-ethyl) - N-[5,6,7 - tetrahydroquinazolinyl-(2)]-benzene-sulfanamide.

3. A compound according to claim 1 designated 4-($\beta$-2'-methoxy-5'-methyl - benzamino-ethyl) - N - [5,6,7,8-tetrahydroquinazolinyl-(2)]-benzene-sulfonamide.

4. A compound according to claim 1 designated 4-($\beta$-5'-chlor-2'-methoxy-benzamino-ethyl)-N-(6,7,8,9 - tetrahydro-5H-cyclohepta[d]pyrimidin-2 - yl) - benzene-sulfonamide.

5. A compound according to claim 1 designated 4-($\beta$-benzamino-ethyl) - N - [5,6,7,8 - tetrahydroquinazolinyl-(2)]-benzene-sulfonamide.

6. A compound according to claim 1 designated 4-($\beta$-ethoxycarbonyl - ethyl) - N - [5,6,7,8 - tetrahydroquinazolinyl-(2)]-benzene-sulfonamide.

7. A compound according to claim 1 designated 4-($\beta$-acetaminoethyl) - N - [5,6,7,8 - tetrahydroquinazolinyl-(2)]-benzene-sulfonamide.

8. A compound according to claim 1 designated 4-($\beta$-3'-chlorobenzamino-ethyl) - N - [5,6,7,8-tetrahydroquinazolinyl-(2)]-benzene-sulfonamide.

9. A compound according to claim 1 designated 4-($\beta$-phenylmercapto-acetamino-ethyl) - N - [5,6,7,8-tetrahydroquinazolinyl-(2)]-benzene-sulfonamide.

10. A compound according to claim 1 designated 4-($\beta$-cyclohexane-carbonamino-ethyl) - N - [5,6,7,8 - tetrahydroquinazolinyl-(2)]-benzene-sulfonamide.

11. A compound according to claim 1 designated 4-($\beta$-2'-methoxy - benzamino-ethyl) - N - [5,6,7,8-tetrahydroquinazolinyl-(2)]-benzene-sulfonamide.

12. A compound according to claim 1 designated 4-($\beta$-indoline-1-carbonamino-ethyl) - N - [5,6,7,8-tetrahydroquinazolinyl-(2)]-benzene-sulfonamide.

13. A compound according to claim 1 designated 4-($\beta$-benzaminoethyl)-N-(6,7,8,9-tetrahydro - 5H - cyclohepta-[d]-pyrimidin-2-yl)-benzene-sulfonamide.

14. A compound according to claim 1 designated 4-(N-methyl-$\beta$-5'-chloro-2'-methoxy-benzamino - ethyl) - N-(6,7,8,9-tetrahydro-5H-cyclohepta-[d]-pyrimidin-2 - yl)-benzene-sulfonamide.

15. A compound according to claim 1 designated 4-($\beta$-5'-chloro-2'-methoxy-benzamino - ethyl) - N - (7,8- dihydro-5H-thiapyrano-[4,3-d]-pyrimidin-2-yl)-benzene - sulfonamide.

References Cited

UNITED STATES PATENTS

| | | | |
|---|---|---|---|
| 3,124,597 | 3/1964 | Stoll et al. | 260—256.5 |
| 3,180,866 | 4/1965 | Horstmann et al. | 260—256.5 |
| 3,242,174 | 3/1966 | McManus et al. | 260—256.5 |
| 3,317,536 | 5/1967 | Grussner et al. | 260—256.5 |
| 3,338,955 | 8/1967 | Aumuller et al. | 260—256.5 |
| 3,346,590 | 10/1967 | Dickore et al. | 260—256.5 |
| 3,377,351 | 4/1968 | Haack et al. | 260—256.5 |

ALEX MAZEL, Primary Examiner

R. J. GALLAGHER, Assistant Examiner

U.S. Cl. X.R.

424—251

UNITED STATES PATENT OFFICE
CERTIFICATE OF CORRECTION

Patent No. 3,520,887            Dated July 21, 1971

Inventor(s) Ruth Heerdt et al.

It is certified that error appears in the above-identified patent and that said Letters Patent are hereby corrected as shown below:

In the heading to the printed specification, lines 8 and 9, cancel "GmbH Antsgeicht, Mannheim, Germany" and insert -- Gesellschaft mit beschrankter Haftung, Mannheim-Waldhof, Germany, a corporation of Germany. --. Column 3, line 25, ""aminopyirimidine" should read -- aminopyrimidine --; line 42, "of" should read -- or --. Column 8, line 20, "phenoxyaceto-amino-" should read -- phenoxyacetamino- --; line 71, cancel "a". Column 9, line 36, after "folling" insert -- i.v. --. Column 11, line 30, insert a comma after "alkyl", second occurrence; line 47, "-N-[5,6,7-" should read -- -N[5,6,7,8- --.

Signed and sealed this 27th day of April 1971.

(SEAL)
Attest:

EDWARD M. FLETCHER, JR.           WILLIAM E. SCHUYLER, JR.
Attesting Officer                   Commissioner of Patents